June 30, 1953　　　M. J. MARTIN　　　2,643,772
FILTER
Filed Jan. 7, 1948　　　2 Sheets-Sheet 1
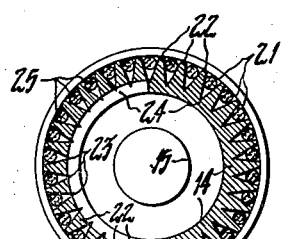
FIG. 3.
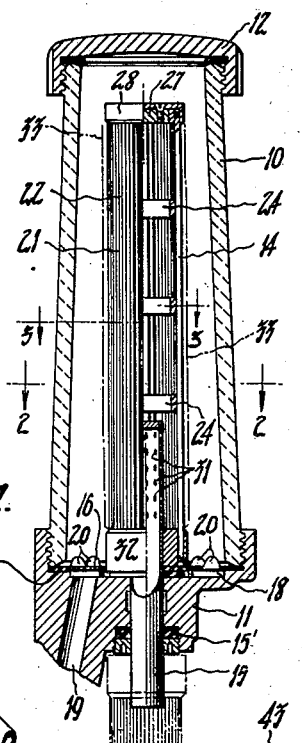
FIG. 1.
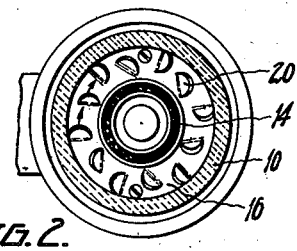
FIG. 2.
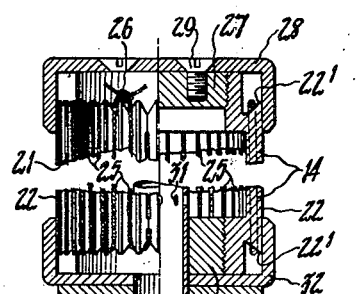
FIG. 4.
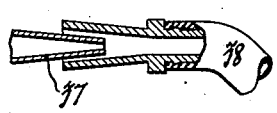
FIG. 5.
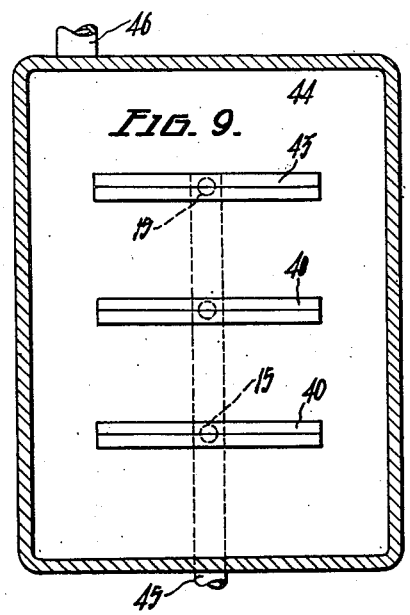
FIG. 9.
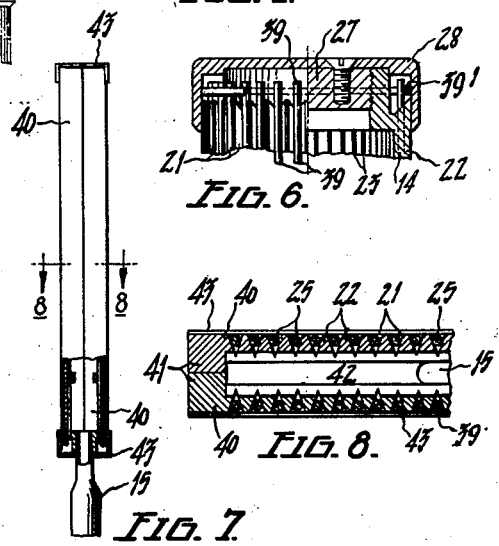
FIG. 6.
FIG. 8.
FIG. 7.
INVENTOR
MICHAEL J MARTIN
BY Young, Emery & Thompson
ATTYS.

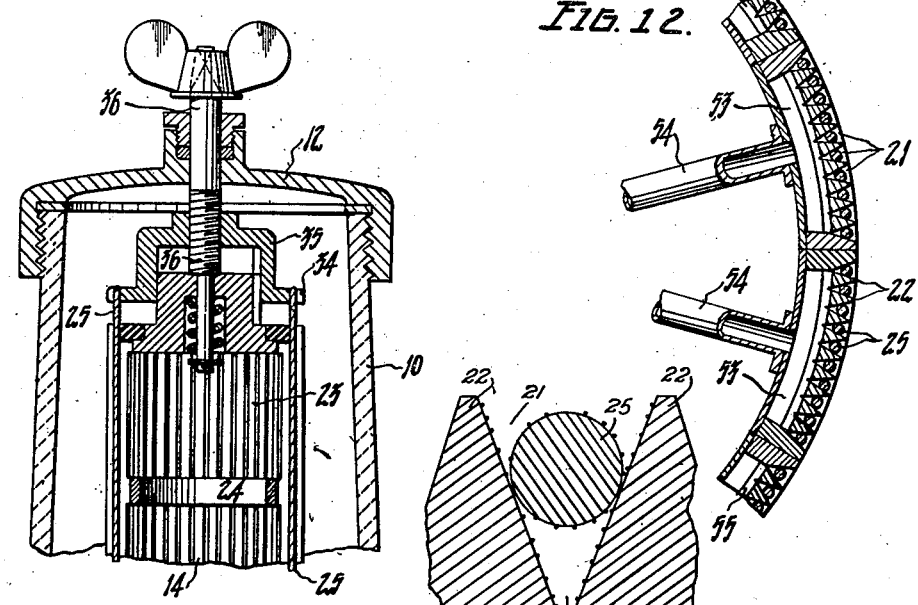

Patented June 30, 1953

2,643,772

UNITED STATES PATENT OFFICE 2,643,772

FILTER

Michael James Martin, Armadale, Victoria, Australia

Application January 7, 1948, Serial No. 852
In Australia February 27, 1947

8 Claims. (Cl. 210—183)

1

This invention relates to filters of the kind wherein narrow straining spaces are formed by and between the edges of discs, wires or cords or the constituent elements thereof or other suitable preformed members.

The elements forming the aforesaid straining spaces of such filters are commonly used to support filtering beds formed of suitable filter aid material but difficulty has heretofore been experienced in devising elements having apertures of sufficiently small dimensions to retain the filter aid during filtration and which additionally may be readily cleaned by a back-washing or other cleansing operation.

Now the general object of the present invention is to provide improvements in filters of the general character referred to, while one specific object is to provide improvements in the construction of edge filter elements whereby the abovementioned disadvantage will be obviated or minimised.

Accordingly, one broad feature of the invention resides in a filter member comprising a support having a surface formed with a plurality of substantially straight, inwardly convergent grooves and a filler member arranged longitudinally within each of said grooves and normally bearing against the opposite sides thereof, said grooves communicating below said filler members therein with filtrate discharge openings.

The said support may be of cylindrical shape, in which case the said grooves extend substantially longitudinally thereof, or same may comprise a flat or arcuate former plate or other suitably shaped member.

The said filler members may comprise rods, cords, wires, elastic threads or the like formed of metal textile fibres or of any other suitable material. The said cords, yarn or wire may be twisted, plaited or braided, or in the case of semi-rigid materials same may be in the form of close helical windings.

When said filler members comprise relatively rigid rods, same are preferably formed separately from each other and are retained to the support by end retaining means so constructed as to permit each filler member to move inwardly and outwardly within the accommodating groove to a limited extent.

When said filler members are flexible, a continuous length thereof may be laid along the successive grooves and around abutments at the opposite ends of the support, the free ends of such continuous length being secured either to each other or to suitable supports. Alternatively a separate flexible filler member may be laid in each groove.

The said abutments at one end at least of the former may be movable relatively to the body of the element to vary the tension on the filler members for the purpose hereinafter described.

The invention also includes a filter having a chamber containing a filter member as above described, means for directing into one end portion of the chamber the liquid to be filtered and means for imparting a swirling motion to the liquid entering the chamber whereby it will rotate therewithin and around the filter element.

Other features of the invention are hereinafter described.

For a more particular description of exemplary forms of the invention reference will be made to the accompanying drawings in which:

Figure 1 is a view in sectional elevation of a small cylindrical filter.

Figure 2 is a view in sectional plan taken on the line 2—2 of Figure 1.

Figure 3 is a view in sectional plan of the element of the filter shown in Figures 1 and 2 and is drawn to a larger scale, such view being taken on the line 3—3 of Figure 1.

Figure 4 is a view half in elevation and half in section of the element of the filter shown in Figures 1 and 2.

Figure 5 is a view in sectional elevation of an injector for mixing air with backwashing liquid.

Figure 6 is a view half in elevation and half in section of a modified construction of cylindrical filter element.

Figure 7 is a view in end elevation and partly in section of a flat rectangular filter element.

Figure 8 is a view in sectional plan and is taken on the line 8—8 of Figure 7.

Figure 9 is a diagrammatic view in sectional plan showing a plurality of filter elements arranged within a common chamber.

Figure 10 is a view in sectional elevation showing a modification of the filter element shown in Figure 4.

Figure 11 is a view in elevation showing certain applications of the invention to a sand filter.

Figure 12 is a view in sectional elevation showing one application of the invention to the drum of a rotary suction drum filter, and Figure 13 is a fragmentary transverse sectional view of one of the filler members and a portion of the grooved former of the filter.

The filter shown in Figures 1 to 4 inclusive comprises a filter chamber having a vertically arranged tubular body 10 which is preferably formed of transparent plastic material and which converges upwardly to some extent as shown.

The tubular body 10 is open at each end and the lower end thereof is detachably secured to and forms a watertight joint with a base 11 while the upper end thereof is normally closed by a screw cap 12.

A hollow former 14 of a cylindrical filter element is arranged axially within the body and is provided at its lower end with a central filtrate discharge tube 15 which extends slidably through a suitable seal 15' in the base 11.

An annular deflector plate 16 arranged transversely within the base 11 is clamped at its periphery between the lower end of the body 10 and a shoulder 17 within the base and is located above an annular liquid space 18 in the latter. The liquid to be filtered is supplied to the space 18 through a supply passage 19 and same enters the filter chamber through a plurality of openings 20 formed by slitting the plate 16 and by bending upwardly the lugs 20 so produced. The lugs 20 all extend in the same direction so that the entering liquid is caused to swirl within the filter chamber and around the central element.

A plurality of longitudinally extending grooves 21 is formed in the outer periphery of the cylindrical former of the filter element, such grooves being separated by narrow integral ribs 22. Each groove is of inwardly convergent shape in cross section and same communicate by interrupted slits 23 with the interior of the hollow former.

Preferably the former 14 is made from a suitable length of extruded tubing of the cross-section shown at the right of Figure 3. The bore of suitably spaced sections of the tube is then enlarged to a diameter somewhat greater than the diameter at the base of the grooves 21 so that the aforesaid narrow slits 23 are formed as shown at the left of Figure 3, but these spaced counterbored sections are separated by relatively narrow integral rings 24 by which the parallel longitudinal ribs 22 remain rigidly connected together.

The external diameter of the upper and lower end portions of the tube is reduced below the diameter of the base of the grooves 21 so that the ribs 22 terminate short of such ends and the ends of the ribs are preferably undercut as shown at 22' in Figure 4.

A flexible filler member, viz. a twisted or braided metal wire or textile cord or yarn 25 is then laid under tension in each of the grooves 21 so that it extends longitudinally of the former. Preferably a continuous length is arranged to extend backwards and forwards along adjacent grooves and around the abutments formed by the undercut ends 22' of the ribs 22 as shown in Figure 4, the free ends thereof being finally tied together as shown at 26 in the same figure. It will be noted that the diameter of the filler member 25 is less than the width of the grooves 21 at the outer portions of the latter and greater than the width at the inner portions thereof.

The open upper end of the tubular former 14 is closed by a plug 27 and a skirted cap 28 detachably secured thereto by screws 29 encloses the upper ends of the ribs 22 and prevents the filler member from slipping off the ends of said ribs.

Similarly, the lower end of the former is fitted with a plug 30 through which the aforesaid filtrate discharge tube 15 extends, the latter being preferably closed at its upper end and provided within the former with strainer holes 31. A detachable skirted retaining cap 32 is similarly fitted to the lower end of the former to enclose the adjacent ends of the ribs 22.

Accordingly liquid may pass from the interior of the filter chamber to the interior of the element disposed centrally therein only by passing through the minute straining spaces provided by the interstices of the filler member 25 and/or between the edges of the latter and the sides of the coacting ribs 22 defining the accommodating groove 21.

In use if it is necessary or desirable to use a filter aid a suitable amount of the latter is mixed with a liquid, e. g. water, and same is poured into the top of the filter chamber, the screw cap 12 being removed for this purpose.

This cap is then replaced and the water to be filtered is then supplied to the bottom of the chamber through the inlet passage 19. The inclined deflector lugs 20 cause the water to swirl within the filter chamber and around the filter element so that the filter aid suspended therein is deposited on the element in the form of a uniform layer 33 (Figure 1) as the liquid passes through the wall of the element into the central space thereof and thence to the discharge tube 15 and the upwardly convergent shape of the tubular body 10 facilitates the formation of this layer.

The water passing inwardly through the element presses the filler member 25 firmly into the accommodating grooves 21 so that the liquid is constrained to pass either through the interstices of the filler or through the minute spaces between it and the sides of the coacting ribs 22 defining the accommodating groove 21.

When it is necessary to cleanse the filter, water, preferably filtered, is passed in the reverse direction through the filter element. This is conveniently effected in the case of the small filter shown in Figure 1 by removing the element from the chamber and then replacing the cap 12. The discharge tube 15 of the filter element is then inserted upwardly into the chamber through and is frictionally retained by the seal 15' so that said element is inverted and depends from the base 11 as shown in broken lines in Figure 1.

The cleansing water is then delivered through the inlet passage 19 to the filter chamber from which it passes downwardly into the interior of the inverted filter element through the tube 15 and thence outwardly through the grooves 21 therein whereby the filter aid is dislodged together with the impurities collected thereby.

Thus during this cleansing operation the filler member 25 in each groove 21 is pressed outwardly by the outwardly flowing liquid towards a wider portion of the groove to permit of the free passage of the liquid and facilitate dislodgment of the filter aid and other particles. When the cleansing operation is completed the tension of the filler member causes it to return to its normal inward position.

Alternatively the filter element may be cleansed by an ordinary back washing operation while it remains in its normal position within the filter chamber for which purpose the passage 19 is opened to waste, and liquid under pressure is delivered to the interior of the element through the tube 15.

If desired, means may be provided whereby the tension of the filler member 25 may be relieved during the cleansing operation. Thus in the elementary construction shown in Figure 10 the upper bends of said filler member are looped around radial abutment projections 34 on a member 35 which is slidably but non-rotatively mounted on a reduced extension on the upper end of the element former and any suitable means are provided for adjusting the member 35 axially to regulate the tension. Thus in the illustrated embodiment an axial adjusting screw 36 engages a corresponding screw thread in the member 35 and bears against the closed upper end of the former and this screw may project through a seal in the top cap 12 of the filter chamber, as shown.

Accordingly, when it is desired to backwash the filter, the tension on the flexible filler member 25 may be relieved by means of the screw 36.

In lieu of moving the member 35 axially with respect to the body of the element former, it may be moved angularly thereon to regulate the tension of the cords 25. When this construction is adopted a separate flexible filler member is preferably arranged in each groove and is attached at its upper end to the member 25.

If desired, air may be entrained in the water to be used for back washing the filter, as it is found that the air expands when passing outwardly through the filter element. The tensioned filler member is thus subjected to a pulsating pressure and the resultant movements thereof facilitate the dislodgment of the filter aid or other material therefrom. For example, and as indicated in Figure 5, the water used to backwash the filter may be directed through an injector 37 where air is entrained and thence through a rubber tube 38 which is temporarily connected to the passage through which the cleansing liquid is supplied to the interior of the filter element.

In lieu of arranging flexible filler members in the grooves 21 of the filter element, each of said grooves may accommodate a filler member in the form of a relatively rigid rod 39 which is loosely retained in position by means of the skirted end caps 28, as shown in Figure 6. During normal filtration, the rods 39 are pressed inwardly and the liquid may pass only through minute spaces which are formed between the surfaces thereof and the coacting surfaces of the ribs 22 either because such surfaces are naturally sufficiently irregular or because the surfaces of the rods are roughened for the purpose. This is illustrated in Fig. 13, the irregularities being exaggerated.

The liquid pervious medium provided by the grooves and filler members serve as a highly effective filter.

If desired the rods 39 may normally be held in their inner positions by elastic bands 39' which encircle the ends thereof.

The skirted end caps 28, however, enable the rods 39 to move outwardly to a limited extent and thus during the cleansing operation the reverse flow of water presses same outwardly to permit of the free passage of the liquid through the grooves 22.

Figures 7 and 8 show the invention applied to a filter element, the faces of which are of rectangular shape. The body of this element comprises two similar longitudinally grooved flat plates 40, each provided on its inner face with a continuous marginal flange 41, such members being secured together as by screws with the flanges in contact to form a central space 42. The outer face of each of the plates 10 is formed with parallel grooves 21 and intervening ribs 22 as in the construction previously described, the ends of the ribs being also preferably undercut for the purpose already explained. Each of the grooves 22 accommodates either a length of cord or wire, as 25, or a separate rod, as 39, and same are retained in position at their ends by detachable angle section retaining strips 43.

The filter element is fitted with a discharge tube 15 which communicates at its upper end with the internal space 42.

It will be evident that any desired number of filter elements may be arranged within a common filter chamber. Thus Figure 9 shows diagrammatically in plan a filter chamber 44 accommodating three rectangular filter elements of the kind shown in Figures 7 and 8. The liquid to be filtered is supplied through a pipe 45, while the filtrate is discharged through a common effluent pipe 46.

Filter elements as above described may also be advantageously used in sand filters, water softeners and the like to prevent the escape of granular material therefrom. Thus as shown in Figure 11, a plurality of spaced filter elements 47 is arranged within a bed 48 of sand in a pressure filter chamber 49 to collect the filtered water which passes to a common effluent pipe 50, while similarly the water to be filtered is distributed in the top of the chamber by a plurality of spaced filter elements 51.

During normal filtration the water to be filtered is directed to the interior of each of the filter elements 51 from a common supply pipe 52 and passes outwardly therethrough to the filter chamber, it being understood from the foregoing description that the cords or wires 25 or the rods 39 of the elements are thus pressed outwardly to permit of the free passage of water through the grooves 21.

The water thus passes downwardly through the bed 48 which filters out impurities in the usual way and finally passes inwardly through the elements 47 of the collecting system to the effluent pipe 50. These elements 47 thus serve to prevent loss of granular material from the filter bed.

When it is desired to cleanse the filter bed, water is delivered to the pipe 50 and passes therefrom to the filter elements 47 and then upwardly through the chamber to and inwardly through the filter elements 51 to the pipe 52. When, as is usual, the water passes upwardly through the filter chamber at a relatively high velocity, the filter bed is expanded so that ordinarily there is a risk of the lighter and smaller particles of the bed being lost. The elements 51, however, are so constructed as to serve as coarse strainers which will retain granular particles above a predetermined size while allowing "floc" and other impurities to pass therethrough.

The invention is applicable to various other types of pressure and suction filters and Figure 12 shows by way of example one application of the invention to a suction drum similar to those used in suction filters, e. g. filters of the well known Oliver type.

The filter drum is provided as is usual with a concentrically arranged series of peripheral compartments 53, each fitted with a pipe 54 through which the filtrate is withdrawn and the outer face of each of these compartments is formed by an arcuate plate 55 provided with longitudinally extending grooves each accommodating a filler member as previously described.

It will, of course, be understood that filter elements as herein described may be used without a filter aid when the liquid to be treated does not require one to be used and an appropriate filler member 25 or 39 is used.

I claim:

1. A filtering member comprising a rigid support having on one side thereof a liquid entry surface formed with a plurality of substantially straight elongated parallel grooves the sides of which converge inwardly from said surface, said support being also formed with filtrate discharge openings which communicate with the inner portions of said grooves, an elongated preformed self-sustaining filler member individual to, and arranged longitudinally within, each of said grooves and extending from end to end thereof, the thickness of each filler member being less than the maximum, and greater than the minimum, width of the respective groove whereby said filler member normally engages the opposite sides of the grooves and said filler member having small surface irregularities whereby minute strainer openings are formed between it and said sides of the groove.

2. A filtering member comprising a rigid hollow support having at one side thereof a liquid entry surface and at the opposite side thereof, a liquid discharge surface, said liquid entry surface being formed with a plurality of substantially straight elongated and parallel grooves, the sides of which converge inwardly towards said liquid discharge surface, said liquid discharge surface being formed with a plurality of filtrate discharge openings which communicate with the inner portions of said grooves, an elongated preformed self-sustaining filler member individual to, arranged longitudinally within each of said grooves and extending from one end to the other of said grooves, the thickness of each filler member being greater than the maximum, and less than the minimum, width of the respective groove whereby it normally engages the opposite sides of the groove, each of said filler members having surface irregularities whereby, when same engages the sides of the respective groove, minute openings for the passage of liquid are formed therebetween and means coacting with the opposite ends of each filler member and retaining same to the support.

3. A filtering member comprising a rigid hollow tubular support having a plurality of substantially straight elongated and longitudinally extending grooves in its outer surface, said grooves being of inwardly convergent shape in cross section, said hollow support being formed with filtrate discharge openings which connect the interior thereof with the inner portions of said grooves, an elongated preformed self-sustaining filler member individual to, arranged longitudinally within each of said grooves and extending from end to end of said grooves, the thickness of said filler members being greater than the minimum, and less than the maximum, width of the respective grooves whereby same normally bear against the opposite sides of the grooves, said filler members having small surface irregularities whereby minute openings for the flow of liquid are formed between them and the sides of the respective grooves, and means coacting with the opposite end portions of the filler members and retaining them to the support.

4. A filtering member comprising a rigid support having a liquid entry surface at one side thereof and a liquid discharge surface at the opposite side thereof, a plurality of straight parallel and elongated ribs on said liquid entry surface and forming intervening grooves the sides of which converge inwardly towards said liquid discharge surface, said liquid discharge surface being formed with filtrate discharge openings which communicate with the inner portions of said grooves, an elongated preformed self-sustaining filler member individual to, arranged longitudinally within each of said grooves and extending from end to end of the grooves, the thickness of each filler member at each cross section thereof being greater than the minimum and less than the maximum, width of the respective groove whereby it normally engages the opposite sides of the latter, each such filler member being irregular in thickness whereby when same engages the sides of the respective grooves, small passages for the flow of liquid are formed therebetween and two end members respectively detachably secured to the opposite ends of the support and retaining the adjacent ends of the several filler members within the respective grooves therefor.

5. A filtering member comprising a rigid support having a liquid entry face at one side thereof and a liquid discharge face at the opposite side thereof, a plurality of substantially straight elongated and parallel ribs on said liquid entry face and defining intervening grooves the sides of which converge inwardly towards said liquid discharge face, said liquid discharge face being formed with filtrate discharge openings which communicate with the inner portions of said grooves, an elongated continuous preformed and self-sustaining flexible filler member laid within and extending longitudinally through the several grooves from end to end in succession and around the ends of the intervening ribs and a pair of retaining members detachably secured respectively to the opposite ends of the support and covering the adjacent portions of said filler member and the adjacent end portions of the ribs, the thickness of said filler member being greater than the minimum, and less than the maximum, width of said grooves and said filler member having throughout its length small surface indentations whereby when same engages the sides of the grooves, small passages for the passage of liquid are formed therebetween.

6. A filtering member comprising a support having a liquid entry face at one side thereof and a liquid discharge face at its opposite side, said liquid entry face being formed with a plurality of elongated, substantially straight and inwardly convergent grooves through which substantially all of the liquid to be filtered is constrained to pass to said liquid discharge face, an elongated preformed filler member individual to, arranged longitudinally within each of said grooves and extending from end to end of the grooves, the thickness of said filler members being greater than the minimum, and less than the maximum, width of the respective groove whereby same normally bears against the opposite sides of said groove and restricts the flow of liquid therethrough so that said filler members form, in conjunction with the support, a liquid pervious medium, and means on the support and coacting with the filler members adjacent the opposite ends of said grooves to retain said filler members therein.

7. A filtering member comprising a rigid support formed with an internal cavity and having in its outer surface a plurality of elongated and substantially straight and parallel grooves the sides of which converge inwardly towards the said cavity, the wall of the cavity having a plurality of filtrate discharge openings therein communicating with the inner portions of said grooves, a flexible elongated filler member laid under tension within and extending longitudinally through the several grooves from end to end in succession, means arranged adjacent the opposite ends of said grooves and supporting said filler member between adjacent grooves, the thickness of said filler member being greater than the minimum width and less than the maximum width, of the grooves whereby same normally engages the sides of said grooves and said filler member being formed throughout its length with surface indentations whereby when same engages the sides of the grooves, minute openings for the flow of liquid are formed therebetween, and means on each end of the support and covering the adjacent ends of the grooves and the adjacent portions of said filler member.

8. A filler comprising a filter chamber provided with an inlet passage for the liquid to be filtered, a rigid hollow filter element supported within the chamber, means forming a passage for the discharge of filtrate from the interior of said element to the exterior of the chamber, said element being provided on its outer surface with a plurality of substantially straight and elongated grooves the sides of which converge inwardly towards the interior of the element, the inner surface of the element having a plurality of filtrate discharge openings therein communicating with the inner portions of the said grooves, an elongated preformed self-sustaining filler member individual to, arranged longitudinally within each of said grooves and extending from end to end of said grooves, the thickness of said filler member being greater than the minimum and less than the maximum width of the respective groove whereby it normally engages the opposite sides thereof, said filler members having surface variations throughout its length whereby when same engage the sides of the respective grooves, minute openings for the flow of liquid are formed therebetween, and means on the opposite ends of the element and covering the adjacent portions of said grooves and filler members to retain the latter thereto.

MICHAEL JAMES MARTIN.

References Cited in the file of this patent

UNITED STATES PATENTS

| Number | Name | Date |
|---|---|---|
| 689,934 | Vrooman | Dec. 31, 1901 |
| 1,163,334 | Gammage | Dec. 7, 1915 |
| 1,615,559 | Tark | Jan. 25, 1927 |
| 1,685,775 | Dreaper | Oct. 2, 1928 |
| 1,804,512 | Pickard | May 12, 1931 |
| 2,065,263 | Beldam | Dec. 22, 1936 |
| 2,081,198 | Hahn | May 25, 1937 |
| 2,202,191 | Cuno | May 28, 1940 |
| 2,312,999 | De Langen | Mar. 2, 1943 |

FOREIGN PATENTS

| Number | Country | Date |
|---|---|---|
| 265,856 | Great Britain | Feb. 17, 1927 |
| 292,644 | Great Britain | June 25, 1928 |
| 537,088 | Germany | Oct. 30, 1931 |
| 705,309 | Germany | Oct. 30, 1931 |